United States Patent

[11] 3,609,397

[72] Inventor Louis F. Zaman, III
Endicott, N.Y.

[21] Appl. No. 888,580
[22] Filed Dec. 29, 1969
[45] Patented Sept. 28, 1971

[73] Assignee International Business Machines Corporation
Armonk, N.Y.

[54] SIGNAL-CLASSIFYING CIRCUIT
7 Claims, 5 Drawing Figs.

[52] U.S. Cl. .......... 307/235, 328/104, 328/117, 328/137, 328/147, 328/154
[51] Int. Cl. .......... H03k 5/20
[50] Field of Search .......... 307/230, 235, 236, 243; 328/71, 95, 96, 97, 104, 116, 117, 137, 146, 147, 148, 154

[56] References Cited

UNITED STATES PATENTS

| | | | |
|---|---|---|---|
| 2,974,286 | 3/1961 | Meyer | 328/116 |
| 3,031,142 | 4/1962 | Cohen et al. | 328/137 X |
| 3,092,732 | 6/1963 | Milford | 307/235 |
| 3,228,002 | 1/1966 | Reines | 307/235 |
| 3,237,025 | 2/1966 | Clapper | 307/235 X |
| 3,409,830 | 10/1968 | Phillips, Jr. | 328/116 X |

*Primary Examiner*—Donald D. Forrer
*Assistant Examiner*—L. N. Anagnos
*Attorneys*—Hanifin and Jancin and Carl W. Laumann, Jr.

ABSTRACT: A system for identifying and selecting the maximum or minimum value of a single signal or a subset of signals from among a larger set of signals. The system includes an amplifier for each subset of signals. The outputs of the amplifiers are connected in common. Feedback loops from the common output to an input cause all amplifiers, except the one with the largest input signal, to operate in the nonlinear region. Each amplifier is monitored to determine whether or not it is operating linearly.

INVENTOR
LOUIS F. ZAMAN, III

BY [signature]
ATTORNEY

SIGNAL-CLASSIFYING CIRCUIT

CROSS-REFERENCES TO RELATED APPLICATIONS

Application Ser. No. 888,581, filed Dec. 29, 1969, titled "Extreme Level Detector," inventor Robert W. Arnold, and assigned to the common assignee, herein describes a related circuit apparatus.

BACKGROUND OF THE INVENTION

In systems relating to the processing of analog signals, it is sometimes necessary to identify the source of the largest or smallest signal and transmit this signal for further processing. An example of systems which require such circuits are those directed to character recognition. A wide variety of circuits exists for performing this type function. However, some of those which identify the largest signal have no provision for transmitting the same signal for further processing. Similarly, there are circuits which gate the largest signal but do not operate to identify the source of the largest signal. In still other circuits, there is an opportunity for error since the largest signal must exceed the next largest by a substantial factor, say 10 percent, in order to distinguish between them. The circuits usually require high-gain sensitivity in order to distinguish between closely related signals. This makes them susceptible to overload with the attendant recovery problems which limit the speed of the systems. In many situations, there is an advantage in being able to compare various combinations of signals. Where this is a requirement, the circuits can accommodate a plurality of inputs to either input terminal of each comparator.

SUMMARY OF THE INVENTION

The preferred embodiment of the invention is a high resolution comparator for a plurality of analog signals. The comparator serves to select and gate the largest or smallest analog signal, and at the same time, provide a digital signal identifying the analog source which has been gated.

A number of differential amplifiers have their outputs connected to a common load. Each differential amplifier has two input terminals. Signals applied to a first input terminal are amplified and appear in the inverted form at the output. Signals applied to the second input terminal are also amplified but appear at the output in noninverted form.

The analog input signals to be classified are connected to the second input terminals through an input resistor. The inverting input terminals are connected, through a feedback network, to the signal developed at the common load. Since the signal at the load will represent the largest analog input signal, all others being smaller and therefore hidden, only one amplifier will have an output representing a linear relationship to the analog input signal applied to the noninverting input terminal. All the other amplifiers will be driven to cutoff, or at least into the nonlinear region, because, for the maximum level configuration, the feedback signal at the inverting input is greater than the signal at the noninverting input.

A digital output, representing the amplifier which is still in the linear region, is provided by sensing the status of each amplifier to determine whether it is operating linearly or nonlinearly. The foregoing is a description of the circuit operation with the system configuration shown having only one input signal. The circuit, however, is not restricted to a single input per amplifier. Each amplifier may have many inputs of either polarity to either of the two input terminals when each input is applied through its own input resistor. In other words, the rules for applying signals are identical to those of an operational amplifier. With this multiple input configuration, the circuit gates and identifies the set of signals having the maximum or minimum sum.

It is therefore an object of the invention to provide an improved signal-classifying circuit.

It is another object of the invention to provide a signal-classifying circuit which selects and gates only the extreme analog signal and provides a digital output indicating the source of the extreme signal.

Still another object of the invention is to provide a signal-classifying circuit which has improved resolution and the capability of handling a large number of input signals.

An additional object of the invention is to provide a signal-classifying circuit which can be easily switched to select either the maximum or minimum signal.

A still further object of the invention is to provide a multi-input signal classifying circuit which can accommodate combinations of analog input signals at each input to the classifying circuit.

The foregoing and other objects, features and advantages of the invention will be apparent from the following more particular description of preferred embodiments of the invention as illustrated in the accompanying drawings.

DETAILED DESCRIPTION OF THE INVENTION

Figure 1:
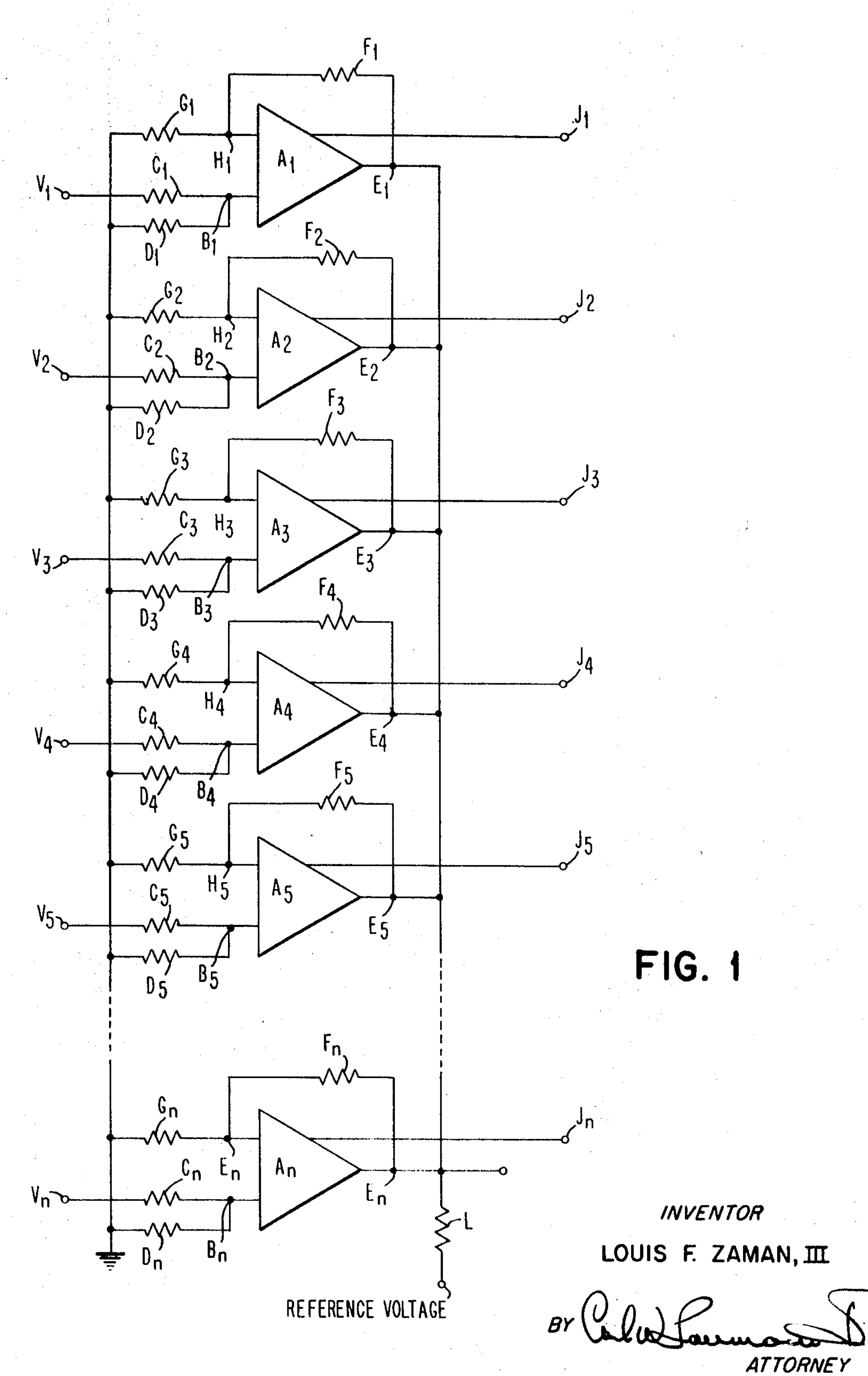
FIG. 1 is a schematic drawing of the system configuration.

In the system shown in FIG. 1, the analog signals $V_1$–$V_n$ to be compared are applied to the amplifiers $A_1$–$A_n$ at the noninverting inputs $B_1$–$B_n$. Each of the noninverting inputs $B_1$–$B_n$ has a pair of resistors $C_1$–$C_n$ and $D_1$–$D_n$ for the purpose of scaling the analog signals and terminating the input to ground, respectively.

The amplified output signals appear at terminals $E_1$–$E_n$. A pair of resistors $F_1$–$F_n$ and $G_1$–$G_n$, connected in a feedback loop between the output terminals $E_1$–$E_n$ and the inverting inputs $H_1$–$H_n$ serve to stabilize the amplifiers.

All of the output terminals $E_1$–$E_n$ are connected to a common load L which is returned to a reference voltage. While this is illustrated as a separate discrete resistor there may be circumstances where the circuit of amplifiers $A_1$–$A_n$ is such that the output is self-terminating and no additional load such as resistor L is required.

Ignoring for the moment the effect of the commoned output terminals, each amplifier would operate to provide an output signal at terminals E which is an amplified version of the input signal applied to terminals B. Each amplifier has the gain, as determined by the ratio of resistors F and G, in accordance with conventional theory governing operational amplifiers. In the case where the gain of the amplifier is equal from both inputs B and H but opposite in sign, it can be seen that the amplifier will tend to operate at a point where the signals at inputs B and H are the same magnitude. If the signal at noninverting input terminal B increases, there is an increase in the value at output terminal E sufficient to increase the value at inverting input terminal H an amount equivalent to the original increase at input terminal B.

If for some reason such as a change in loading, the output voltage at terminal E should increase, the resulting increase in the voltage at the inverting input terminal H causes the output voltage to be reduced until the inputs at terminals B and H are again balanced.

The foregoing discussion of the relationship between the signals at terminals B, E and H is illustrative only of the situation where there is no common output connection. Since the system shown in FIG. 1 has a common output connection of all amplifiers, the circuit operation is modified.

The effect of the common output terminals is to provide an output signal at load L which is representative of the largest signal of $V_1$–$V_n$. Negative feedback is provided from the common load to each inverting input terminal $H_1$–$H_n$. In the case of the amplifier having the largest input signal at terminal B, the amplifier will operate in the usual linear fashion. However, in the case of all the other amplifiers, the operation will be drastically altered to place them in the nonlinear mode. This is due to the fact that the feedback signal, instead of reflecting a signal representing the true output of the amplifier, represents a signal larger than the true output of the amplifier. When this relationship exists between the feedback signal and the signal at the noninverting input, the feedback signal has the effect of reducing the output of the amplifiers below the point where it reflects that value at the noninverting input terminal. The unbalanced state between the inverting and noninverting inputs leads to nonlinear operation of all amplifiers except the one energized by the maximum input signal.

A circuit within amplifiers $A_1$–$A_n$ detects linear or nonlinear operation and provides a digital output signal on lines $J_1$–$J_n$. The details of such a circuit are shown in the circuit of FIG. 2, representing an amplifier-detector circuit suitable for use as $A_1$–$A_n$ in the system of FIG. 1.

Figure 2:
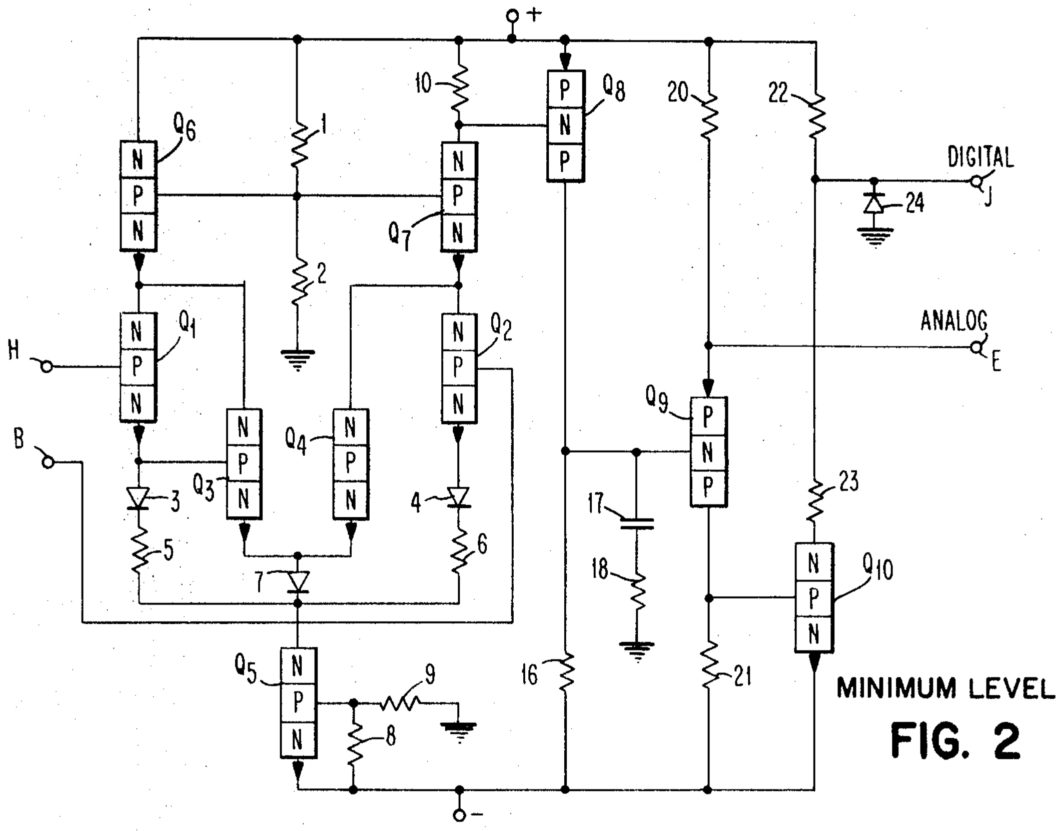
FIG. 2 is a schematic drawing of the amplifier and comparator circuit for minimum level detection in a system configuration such as FIG. 1.

The circuit of FIG. 2 is an amplifier-detector circuit for selecting the minimum signal applied to the inputs $B_1$–$B_n$ as shown in FIG. 1. This circuit includes a conventional differential amplifier stage made up of transistors $Q_1$–$Q_7$. Transistors $Q_1$ and $Q_2$ have their bases connected to inverting input terminal H and noninverting input terminal B, respectively. Transistor pairs $Q_1$, $Q_3$ and $Q_2$, $Q_4$ are connected in a compound configuration. Transistor $Q_5$ operates as a current source to the amplifier. Transistors $Q_6$ and $Q_7$ reduce the voltages seen by the collectors of the compound pairs to prevent collector breakdown and reduce input capacitance. The output signal is developed across resistor 10. The signal across resistor 10 is applied to the base of transistor $Q_8$ which has a collector load resistor 16.

Transistor $Q_9$ serves a dual function. The base of transistor $Q_9$ is connected to resistor 16. When the signal across resistor 16 is within the linear region of amplifier operation, the bias voltage at the base of $Q_9$ is such that current will flow through emitter load resistor 20 and collector load resistor 21. Emitter load resistor 20 may be considered to correspond to the load L of FIG. 1 if the amplifier is self-terminating.

The signal across emitter load resistor 20 is connected to analog output terminal E. This signal will be in phase with the signal at input terminal B. The signal across resistor 21 is applied to the base of transistor $Q_{10}$ to develop a digital output signal across the split load resistors 22 and 23. The digital output signal appears at terminal J.

When the amplifier is operating in the linear region and transistor $Q_9$ is therefore conducting, the voltage across current sensing resistor 21 causes transistor $Q_{10}$ to conduct. The resulting voltage drop across digital load resistors 22 and 23 provides a signal indicating linear operation. The value of resistor 21 is selected so that the minimum level of linear operation causes transistor $Q_{10}$ to be saturated. The output signal at terminal J is essentially two values and may therefore be considered as a digital signal.

In the case of minimum level detection, it is necessary to identify the particular amplifier having the least positive voltage at terminal E. Since all output terminals E are connected in common, the amplifier having the lowest output voltage will control the signal at the output terminal E. In all the amplifiers except the one having the smallest input signal at input terminal B, the feedback signal applied to terminal H will be smaller than the signal at input terminal B. Since the amplifier 10 has a high open loop gain, the reduced feedback signal at terminal H drives it into the nonlinear region.

Since the signal at terminal B is larger than the signal at terminal H, there is a large voltage drop across resistor 10. This signal causes transistor $Q_8$ to conduct heavily and reduce the forward bias at the base of transistor $Q_9$. This causes transistor $Q_9$ to cut off. Even though $Q_9$ is cut off, the output voltage at the commoned terminal E will go no higher than that at the output of the amplifier supplied with the minimum level signal at terminal B.

When transistor $Q_9$ is cut off there is no voltage developed across resistor 21 and transistor $Q_{10}$ is also cut off. This causes the output voltage at terminal J to rise to essentially the same value as the supply voltage. This is the digital signal representing nonlinear operation.

Certain components have not been singled out for elaborate description since they perform well-known functions. Resistors 1 and 2 establish a base biasing voltage for transistors $Q_6$ and $Q_7$. Diodes 3 and 4 serve to provide DC bias temperature compensation. Resistors 5 and 6 are emitter load resistors for $Q_1$ and $Q_2$. Diode 7 provides DC bias temperature compensation. Resistors 8 and 9 bias the base of transistor $Q_5$. Capacitor 17 and resistor 18 connected from the base of $Q_9$ to ground stabilize the circuit. Diode 24 prevents the digital output from dropping below ground.

Figure 3:
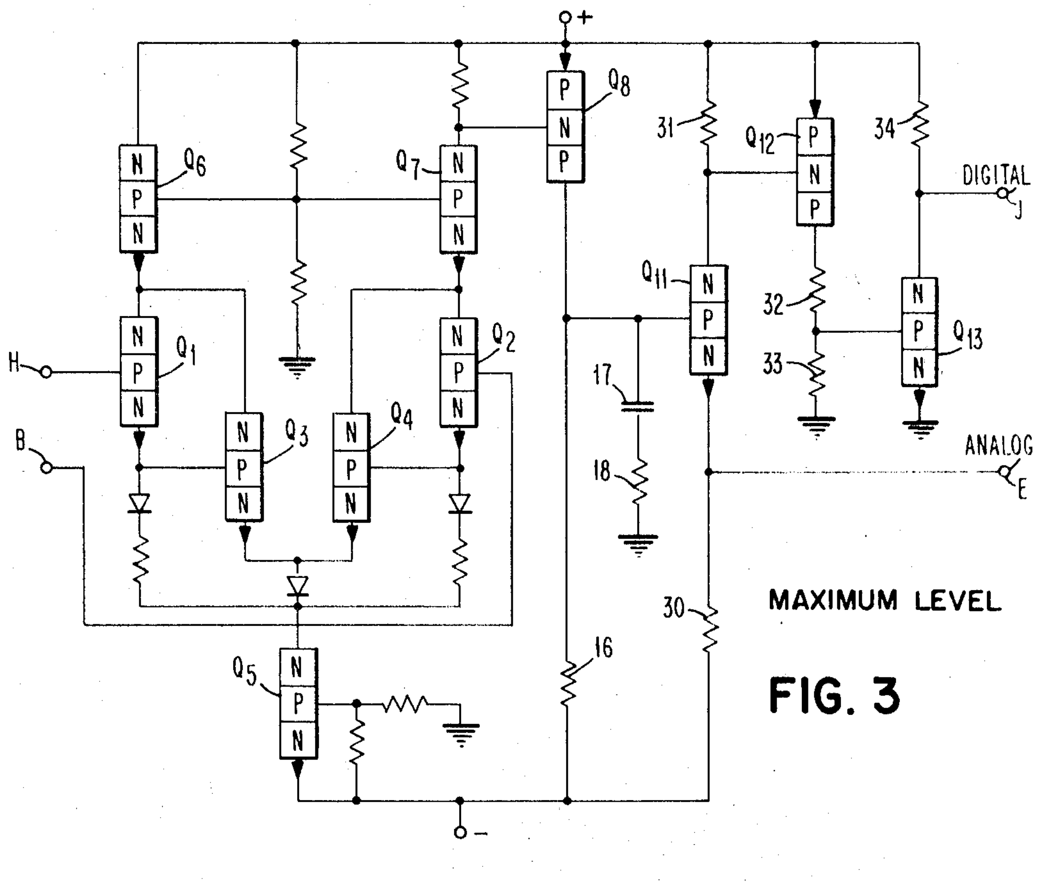
FIG. 3 is a schematic drawing of the amplifier and comparator circuit for maximum level detection in a system configuration such as FIG. 1.

The circuit of FIG. 3 is an amplifier-detector circuit for selecting the maximum signal applied to the inputs $B_1$–$B_n$ in the system of FIG. 1. The operation of the differential amplifier including transistors $Q_1$–$Q_7$ and the coupling stage of transistor $Q_8$ is the same as that of the corresponding portion of FIG. 2. However, in this case transistor $Q_{11}$, which has its base connected to resistor 16, is an NPN instead of PNP. For this reason the analog output voltage is developed across resistor 30 so as to be in phase with the signal applied to terminal B. Resistor 30 may be considered to correspond to the load L of FIG. 1 if the amplifier is self-terminating. Resistor 31, corresponding to resistor 21 in FIG. 2, provides a means for sensing the current flowing through transistor $Q_{11}$.

As long as $Q_{11}$ is conducting above a minimum level the voltage at the base of transistor $Q_{12}$ will be sufficient to assure some conduction through $Q_{12}$. This current creates a voltage drop across resistors 32 and 33. The voltage across resistor 33 biases transistor $Q_{13}$ into conduction and provides a digital output signal across resistor 34. By proper selection of resistors 32, 33 and 34 this digital signal can be set to the same value as the digital signal representing linear operation in FIG. 2.

Both the circuit of FIG. 2 and that of FIG. 3 use current sensing resistors 21, 31 in series with a transistor collector circuit. The assumption is that a transistor must be conducting over a minimum level if it is operating in the linear region. While this technique for determining the region of operation is fully satisfactory in most situations there are alternatives which may be employed.

Figure 4:
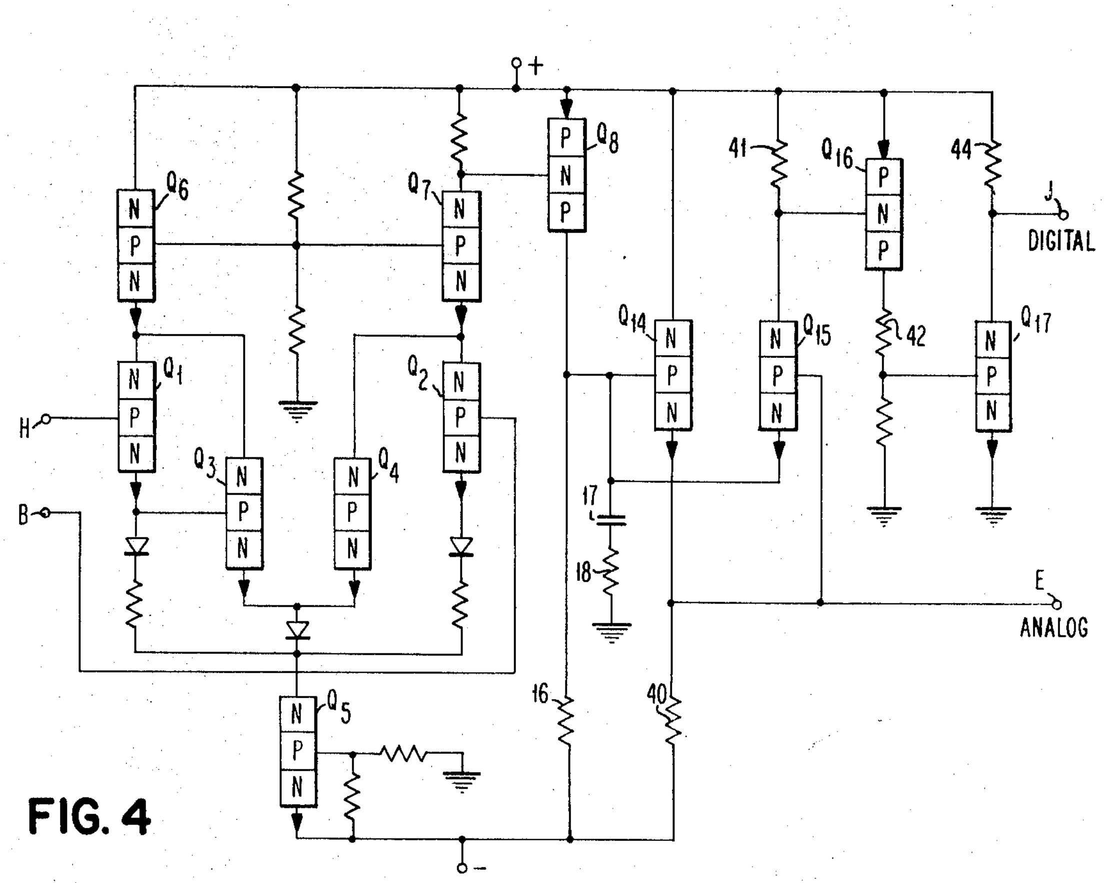
FIG. 4 is a schematic drawing of an alternative circuit to that of FIG. 3.

One alternative is shown in FIG. 4. This circuit, like that of FIG. 3, is for the purpose of selecting the maximum input signal applied to terminals B in FIG. 1. The operation of the circuit through transistor $Q_8$ is identical to the circuit of FIG. 3. The signal at the base of transistor $Q_{14}$ is the same as the signal at the base of transistor $Q_{11}$. The analog output signal is developed across resistor 40 which may be considered to correspond to load resistor L of FIG. 1 if the amplifier is self-terminating. The circuit differs in that, instead of sensing current flow by means of a current sensing resistor such as resistor 20, the emitter-base voltage of transistor 14 is sensed instead.

To this end an NPN transistor $Q_{15}$ is cross-connected with transistor $Q_{14}$. The base of transistor $Q_{15}$ is connected to the emitter of transistor $Q_{14}$ and the base of transistor $Q_{14}$ is connected to the emitter of transistor $Q_{15}$. Thus, when the base-emitter junction of transistor $Q_{14}$ is forward biased the base-emitter junction of transistor $Q_{15}$ is reverse biased and transistor $Q_{15}$ is held in the cutoff condition.

When the feedback signal at input terminal H exceeds the signal at input terminal B, the high gain of the amplifier causes transistor $Q_8$ to cut off. The emitter of transistor $Q_{15}$ will be held at a diode drop below the output voltage at terminal E which is at some higher positive level, sustained by the amplifier in the system which has the greatest signal applied to input terminal B.

The forward bias condition of the base-emitter junction of transistor $Q_{15}$ causes this transistor to conduct and draw current through resistor 41. The base-emitter junction of transistor $Q_{16}$ is forward biased by the voltage drop across resistor 41. The current which flows through transistor $Q_{16}$ and resistors 42 and 43 as a result of the forward biased base-emitter junction, creates a forward bias at the base-emitter junction of transistor $Q_{17}$. When transistor $Q_{17}$ conducts as a result of the forward biased base-emitter junction, the voltage of digital output terminal drops from the supply voltage to a lower value, corresponding to the digital output voltage representing nonlinear operations. In this case, the digital output voltage representing nonlinear operation is less than the supply voltage. Linear operation results in transistor $Q_{15}$ being cut off. With transistor $Q_{15}$ cut off, $Q_{16}$ and $Q_{17}$ are also cut off. The digital output voltage for linear operation is therefore essentially the same as the supply voltage. In this respect, it differs from the circuits of FIGS. 2, 3, and 5 which signals linear operation with a digital signal less than the supply voltage.

Figure 5:
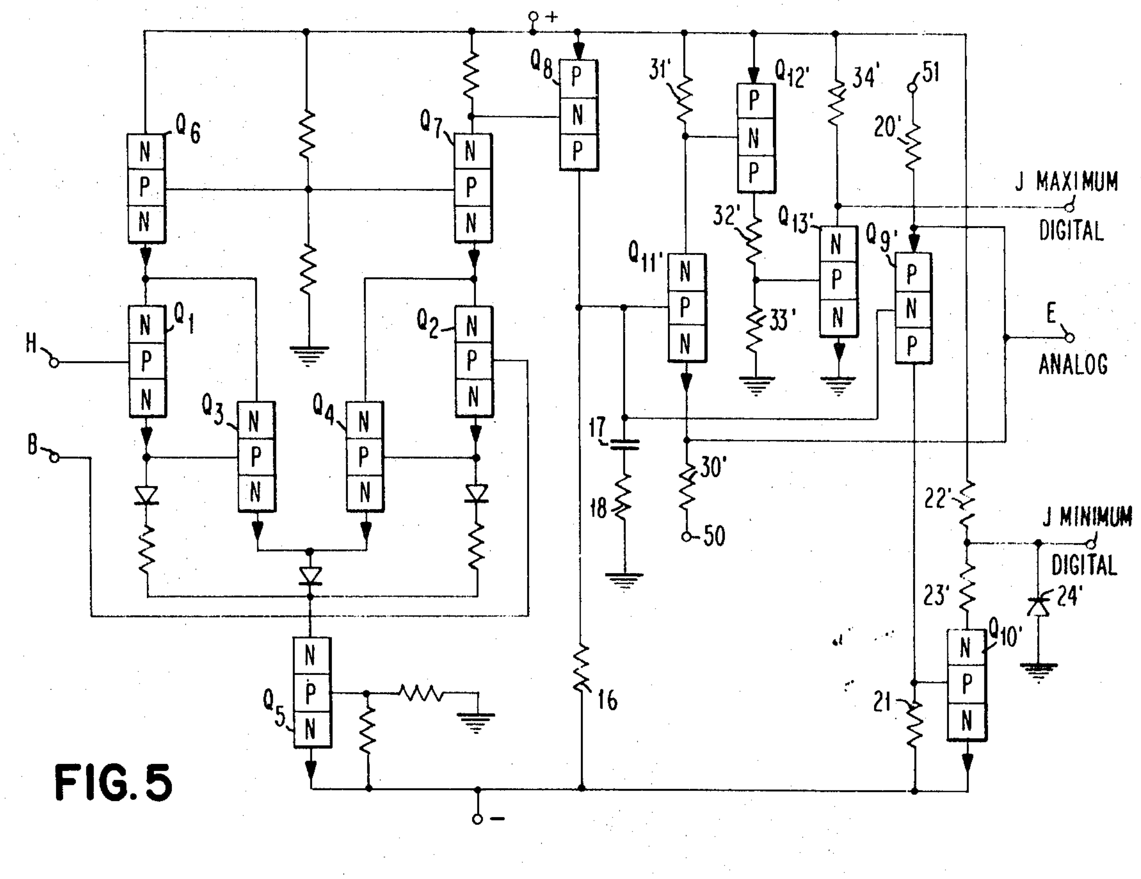
FIG. 5 is a schematic drawing of an amplifier and comparator circuit for the selection of either maximum or minimum level signals in a system configuration such as FIG. 1.

The circuit of FIG. 5 is designed to select the maximum or minimum voltage by activation of alternative portions of the circuit. It is essentially a combination of the digital-sensing circuits of FIGS. 2 and 3. The portions of the circuits taken from these Figures are identified by primed reference characters. Selection of the maximum level circuitry is accomplished by connecting terminal 50 to the negative supply terminal. The minimum level circuitry is selected by connecting terminal 51 to the positive supply terminal.

While the invention has been particularly shown and described with reference to preferred embodiments thereof, it will be understood by those skilled in the art that the foregoing and other changes in form and details may be made therein without departing from the spirit and scope of the invention.

I claim:

1. A system for identifying and transmitting the extreme value from among a plurality of input signals comprising, a plurality of signal amplifiers each having:

an inverting input, a noninverting input, and an output, said input signals being applied to said noninverting inputs in a predetermined manner, means connecting said outputs in common to provide a common output thereat indicative of the particular input signal having the extreme value, means connecting the common output signal to each of said inverting inputs, and a plurality of means individually connected to said amplifiers for indicating the existence of a predetermined relationship between the common output signal and each of said input signals.

2. A system according to claim 1 wherein said last-named means comprises, sensing means responsive to linear operation of an amplifier for indicating the presence of the extreme valued signal at the noninverting input to said linearly operating amplifier.

3. A system according to claim 1 wherein said last-named means comprises, sensing means responsive to nonlinear operation of an amplifier for indicating the absence of the extreme valued signal at the noninverting input to said nonlinearly operating amplifier.

4. A system according to claim 1 wherein said last-named means is responsive to the linearity of the relationship between said input signals and the common output signal.

5. A system according to claim 1 wherein, said last-named means is a circuit connected to an amplifying element within said signal amplifier to provide an output-indicating signal indicating when said amplifying element is operating in a nonlinear region.

6. A system according to claim 5 wherein, said amplifying element is a semiconductor device having an output electrode connected to said commonly connected outputs and an input electrode controlled by the difference between the signals applied to said inverting and noninverting inputs.

7. A system according to claim 6 wherein, said semiconductor device is a junction transistor, and the junction between said input electrode and said output electrode is in a reverse biased state when the common output signal exceeds the normal output signal of said amplifier.